INVENTOR.
FRANCIS R. ELLENBERGER
BY
George R. Powers
ATTORNEY—

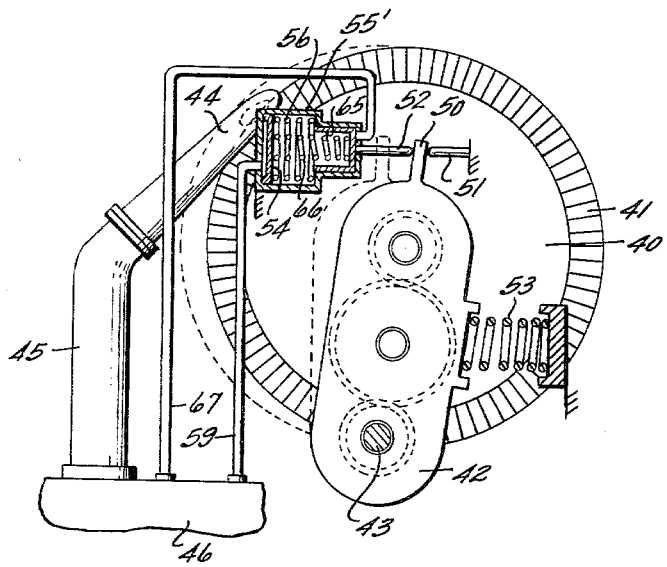

United States Patent Office 3,202,397
Patented Aug. 24, 1965

3,202,397
SYSTEM FOR CONTROLLING THE MAXIMUM TORQUE DEVELOPED BY FLUID TURBINES
Francis Richard Ellenberger, Marblehead, Mass., assignor to General Electric Company, a corporation of New York
Filed June 27, 1963, Ser. No. 291,199
7 Claims. (Cl. 253—59)

This invention relates to control systems for fluid turbines and, more particularly, to improved control systems for gas turbine starters and is especially suited for use in situations in which design requirements severely limit the maximum output torque which can be developed by the starter.

A gas turbine starter is a relatively small gas turbine unit powered by a source of gas or other motive fluid under pressure for bringing the rotor of a large gas turbine engine up to self-sustaining speed. In this type of application, the starter output shaft is mechanically connected to the engine gearbox through which it transmits its torque to the engine rotor. It will be appreciated that the starter output torque must not exceed the maximum torque level for which the gearbox is designed. In practice, it has been found that certain gas turbine engines, particularly aircraft engines where minimum weight is a prime design criterion, have gearbox torque limits which are relatively low. In fact, the maximum allowable gearbox torque may be only slightly greater than the maximum engine drag torque at the gearbox.

It will be appreciated also that the torque required to turn the rotor of the driven gas turbine engine varies over a relatively wide range with engine speed. For example, this drag torque at the beginning of the start cycle consists primarily of friction. As the speed increases, however, the rotating losses of the engine, primarily windage, increase substantially, the drag torque therefore reaching a maximum just as the engine rotor reaches its firing speed. The drag torque is also affected by the ambient temperature. At any given engine speed, the load imposed on the starter at −65° F. is substantially greater than the load imposed at +160° F., these temperatures representing roughly the range of operating temperatures for which equipment of this type must be designed. In other words, engine drag torque varies widely with both engine speed and environmental conditions. It thus becomes obvious that maximum drag torque occurs during low temperature starting just as the engine reaches its firing speed. As pointed out previously, this maximum engine drag torque is in some engines only slightly lower than the maximum allowable gearbox torque.

It is a common practice to supply the pressurized gas required to drive the starter from a high pressure source such as a propellant cartridge. One problem encountered when using a cartridge type starter is related to the variation in burn rate of the propellant with ambient temperature. In the typical situation, the propellant will have a much higher burn rate at the higher temperatures than at the lower temperatures. In fact, for some propellants, the burn rate at +160° F. is as much as twice the burn rate at −65° F.

A conventional fixed wheel starter has turbine buckets which are at all times fully immersed in the motive fluid stream. The output torque from such a starter varies widely with ambient temperature since the input torque imposed on the starter turbine wheel by the fluid stream varies directly with the propellant burn rate. In other words, the maximum starter output torque occurs at the highest propellant burn rate. Since the engine gearbox torque limit must not be exceeded, this means that the starter system must be designed and its elements must be selected such that the starter output torque at the maximum design temperature does not exceed the maximum allowable gearbox torque. At lower ambient temperatures, the starter output torque is substantially reduced in response to the reduced propellant burn rate, the result being that the output torque at lower ambient temperatures is less than the maximum allowable gearbox torque. As pointed out previously, the maximum engine drag torque occurs during low temperature starting just before the engine reaches firing speed. In view of the fact that the maximum engine drag torque in some engines is only slightly lower than the maximum allowable gearbox torque, the net torque available for acceleration at lower ambient temperatures may thus be insufficient for satisfactory operation. In fact, an engine which develops more than normal drag torque, or an engine which has a firing speed higher than normal (which causes the drag to continue to rise), can reduce the net torque available so much that a successful start cannot be made.

It is thus apparent that an ideal cartridge type starter for such an engine would develop the maximum allowable output torque when it is most needed, i.e., at low ambient temperatures. This can be accomplished by designing the starter system and by selecting its elements such that the starter output torque at the minimum design temperature is equal to the maximum allowable gearbox torque. Means must be provided in such a system for preventing the output torque at higher ambient temperatures from exceeding the gearbox torque limit. In the past, these means have taken the form of either flow regulating valves for progressively throttling the flow of motive fluid to the starter turbine wheel or pressure regulating valves for minimizing the increase in the burning pressure of the cartridge with progressively higher ambient temperatures. In either case, the valves must control the flow of erosive gas under high temperature and high pressure conditions. The problems relating to accuracy of control, endurance, and reliability in these regulating means are quite substantial; accordingly, it has been found in practice that these devices are not entirely satisfactory.

It is therefore a primary object of this invention to provide an improved control system for fluid turbines which is capable of limiting the maximum output torque produced by the turbine.

It is another object of this invention to provide a control system for cartridge type starters which is capable of scheduling maximum starter output torque at the minimum expected ambient temperature.

It is a further object of this invention to provide an improved control system for cartridge type starters which is capable of scheduling substantially constant maximum starter output torque at all operating temperatures.

A still further object of this invention is to provide a control system which provides the above objects and is relatively simple in construction and reliable in operation.

Briefly stated, in accordance with the illustrated embodiments of the invention, the above and other objects are accomplished by rotatably mounting the turbine wheel of the starter on a pivotably mounted yoke which may be pivoted to move the wheel into and out of the gas stream. At any given ambient temperature, the maximum torque exerted on the turbine wheel will occur when the wheel is in its position of maximum immersion in the fluid stream. Recognizing this, the control system of this invention provides novel means for controlling the maximum torque exerted on the wheel and, hence, the maximum output torque by varying the maximum degree of immersion of the wheel in the fluid stream as a function of the pressure of the motive fluid such that a substantially constant maximum torque is exerted on the wheel at all pressures. The pressure is, of course, directly related to the ambient temperature. The means utilized comprise movable stop means positioned in the path of the movable yoke to engage the yoke and thereby limit the maximum degree of immersion of the wheel. An adjusting mechanism responsive to the pressure of the motive fluid is connected to the stop means for varying the position of the stop means. The stop means is varied such that the maximum degree of immersion is increased at low ambient temperatures and decreased at high ambient temperatures.

The novel features of this invention are set forth with particularity in the appended claims. The invention, however, both as to its organization and method of operation, together with further objects and advantages thereof, may best we understood by reference to the following description taken in connection with the accompanying drawings in which:

FIG. 6 is a schematic presentation of the control means of this invention in combination with means for preventing undesired movement of the starter elements when the starter is inoperative.

Figure 1:
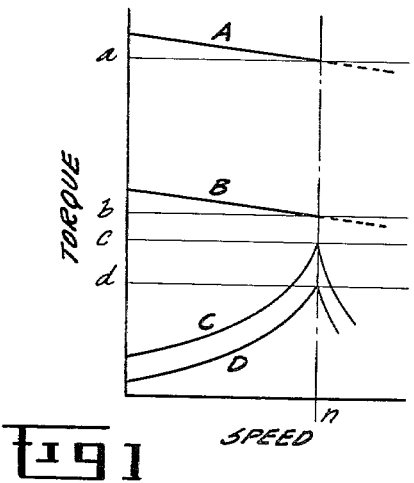
FIG. 1 is a graphical illustration of variations of starter output torque and engine drag torque with ambient temperature for a typical fixed wheel starter arrangement.

Referring first to FIG. 1, in which the variations of starter output torque and engine drag torque with ambient temperature for a typical fixed wheel starter arrangement are illustrated, line A represents the output torque developed at the maximum ambient temperature and line B represents the output torque developed at the minimum ambient temperature. As indicated previously, these temperatures are typically +160° F. and −65° F., respectively. The difference in the output torque developed at these extreme design temperatures is due to the difference in the propellant burn rate. The slight reduction, or "droop," of output torque with speed at each of the ambient temperature extremes is caused by the reduction in relative velocity between the motive fluid stream and the turbine wheel periphery with increasing speed and by increasing windage losses, and other losses in the starter itself with increasing speed. Lines C and D represent the drag torque of the driven engine during starting at the minimum and maximum design temperatures, respectively. As shown, the engine drag torque at any given engine speed is substantially greater at the minimum ambient temperature than at the maximum temperature.

Still referring to FIG. 1, the vertical distance between lines A and D at any given speed represents the torque available at the maximum design temperature for accelerating the engine when the rotor is turning at that speed. For example, torque represented by distance $ad$ is available for accelerating the engine at its firing speed $n$. At the minimum design temperature, the accelerating torque available at the firing speed is represented by distance $bc$. For simplicity, it has been assumed that the firing speeds at the extreme temperatures are identical. Even under these most adverse conditions experienced at the minimum ambient temperature, it is probable that a successful start can be accomplished since accelerating torque, although small, is always available.

Certain gas turbine engines, particularly those used in aircraft installations, have gearboxes designed to transmit relatively low levels of torque. This in turn places a maximum limit on the allowable starter output torque. Suppose, for example, that a fixed wheel starter system thus has a maximum gearbox torque limit as illustrated by line E of FIG. 2. The starter system must therefore be designed such that the output torque developed at the maximum ambient temperature does not exceed the torque limit at any speed. With line A thus lowered to the position illustrated, line B representing output torque at the minimum ambient temperature is correspondingly reduced. Again, sufficient torque, represented by distance $ad$, is available for accelerating the engine at the maximum ambient temperature. However, under adverse conditions there may not be sufficient torque for accelerating the engine when starting at the minimum temperature. In the example illustrated by FIG. 2, lines B and C intersect at a speed $n'$ which is lower than the firing speed $n$. Since no accelerating torque is available at the speed $n'$, the starter cannot accelerate the engine beyond its firing speed and, consequently, a successful start cannot be accomplished.

Figure 3:
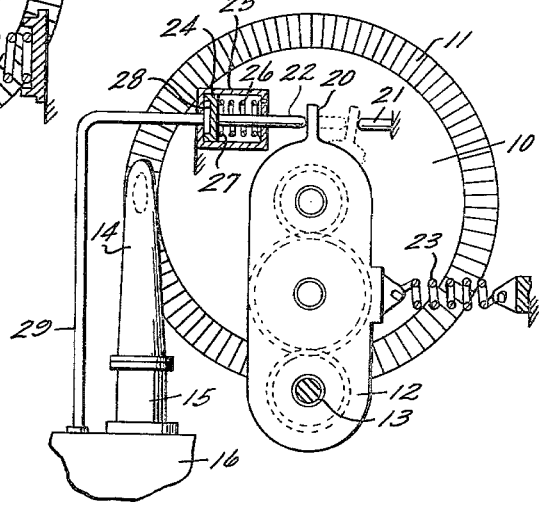
FIG. 3 is a schematic presentation of one type of gas turbine starter utilizing the present invention.

Turning now to FIG. 3, a conventional movable wheel starter control system is illustrated, the system additionally utilizing this invention and thereby overcoming the difficulties discussed above. The starter includes a turbine wheel 10 having a row of peripherally mounted turbine buckets 11 thereon. The turbine wheel 10 is rotatably supported by a movable mounting means, or yoke 12, which may be pivoted about an axis 13 to move the turbine wheel into and out of a high pressure motive fluid stream supplied by a nozzle 14. The nozzle 14 is connected by a supply conduit 15 to a breech 16. The breech 16 contains a cartridge of solid propellant which may be ignited to supply the high pressure motive fluid to the nozzle 14.

The extent of movement of the yoke 12 and, consequently, the turbine wheel 10 is limited by means of a tang 20 on the yoke and first and second stop members 21 and 22, respectively. The position of the stop member 21 is fixed such that the turbine buckets 11 are almost entirely out of the fluid stream supplied by the nozzle 14 when the tang 20 is in engagement with the stop member 21. The position of the stop member 22, which is adjustable in accordance with this invention, limits the maximum degree of immersion of the buckets 11 in the fluid stream. A tension spring 23 applies a relatively light reference force on the yoke 12 in a direction to move the turbine buckets 11 out of the motive fluid stream and the tang 20 into engagement with the stop member 21. Whenever a motive fluid stream is supplied by the nozzle 14 and the starter is connected to a load, the load reaction force on the yoke 12 is oppositely directed to and is sufficient to overcome completely the force of the reference spring 23 to move the tang 20 into engagement with the stop member 22. It will thus be seen that the starter illustrated in FIG. 3 is a two position starter in which the wheel 10 is in either of its "full in" or "full out" positions. In other words, the starter is essentially a fixed wheel starter during starting operation.

The stop member 22 is connected to a piston 24 reciprocably mounted in a cylinder 25. A biasing spring 26 in the cylinder 25 bears against face 27 of the piston 24 to urge the piston 24 and the stop member 22 to the positions illustrated in FIG. 3. The other face 28 of the piston 24 is exposed to the pressure of the motive fluid in the breech 16 through a conduit 29. The spring force of the spring 26 is such that it maintains the piston 24 in the illustrated position until the pressure within the breech 16 exceeds the pressure created by the burning propellant at the minimum ambient temperature. At higher ambient temperatures, as reflected by higher breech pressures, the pressure force exerted on the piston 24 is sufficient to move the piston 24 and the stop member 22 to new equilibrium positions.

The operation of the illustrated control system will now be described. Prior to the initiation of a start cycle, the tension spring 23 holds tang 20 against fixed stop 21. When the propellant in the breech 16 is ignited, the motive fluid strikes the only partially immersed buckets 11 and causes the wheel 10 to rotate. The load reaction force on the yoke 12 overcomes the force of the spring 23 and pivots the yoke 12 until the tang 20 contacts the stop member 22. The tang 20 will remain in contact with the stop member 22 until the load is removed from the starter, after which the spring 23 moves the yoke 12 to the right until the tang 20 again engages the stop member 21.

According to this invention, the maximum allowable output torque is developed when it is most needed, at the minimum ambient temperature. In other words, the invention makes possible the movement of line B of FIG. 2 upwardly into the vicinity of line A. This is accomplished by designing the system such that the torque developed at the minimum ambient temperature with the buckets 11 immersed to the maximum degree as shown by FIG. 3 is specified by line A. At higher ambient temperatures, the stop member 22 is moved to the right as viewed in FIG. 3 to reduce the degree of immersion. The output torque is not correspondingly reduced, however, since the burn rate is increased with increasing temperatures. In fact, knowing the characteristics of a starter in question, it is possible to select the spring 26 and the piston 24 such that the output torque produced at all ambient temperatures is specified by line A of FIG. 2. It will be appreciated that satisfactory starts may thus be accomplished under even the most adverse conditions. For example, at the minimum ambient temperature, it will be seen that an accelerating torque represented by distance $ac$ is available at the firing speed $n$. As described, a constant maximum output torque is scheduled at all ambient temperatures and pressures. It will occur to those skilled in the art that the spring 26 and the piston 24 can be selected to give various maximum output torque levels under the various ambient conditions. For example, it may be desired to provide a slightly greater maximum output torque at the minimum temperature than at the maximum temperature. Similarly, it may be desired to provide a slightly greater maximum output torque at the maximum ambient temperature, the difference in the torque being much less, however, than that which would occur with the conventional type of fixed wheel starter. It is intended to cover these various situations by stating that a substantially constant output torque is scheduled at all ambient temperatures and pressures.

Figure 4:
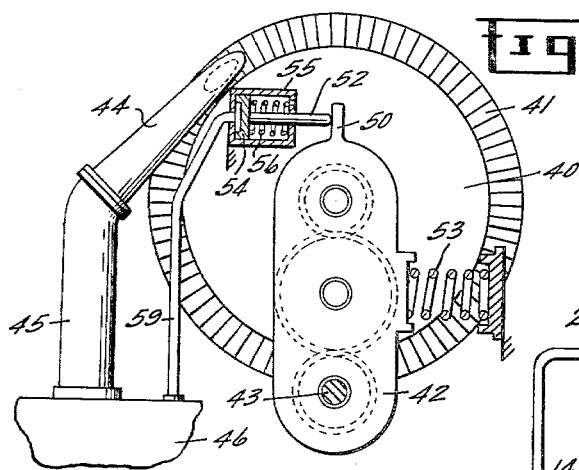
FIG. 4 is a schematic presentation of an alternate type of gas turbine starter utilizing the invention.

The invention may also be utilized in combination with the alternative starter arrangement illustrated in FIG. 4, which includes control means capable of adjusting the output torque so as to provide a particular acceleration characteristic, such as constant acceleration, over the start cycle. The control means for achieving the desired acceleration level is described and claimed in a co-pending application entitled, Acceleration Control for Fluid Turbines, now United States Patent No. 3,107,896, issued on October 22, 1963, to Philip Dantowitz and assigned to the assignee of this invention.

The Dantowitz type of starter arrangement includes a turbine wheel 40 having a row of peripherally mounted buckets 41 thereon, the wheel being rotatably supported by a movable yoke 42. The yoke 42 is pivotable about an axis 43 to move the turbine wheel 40 into and out of a fluid stream supplied by a nozzle 44 connected to a breech 46 by a supply conduit 45. The fluid stream is supplied at an angle at which its force on the wheel 40 tends to move the wheel out of the fluid stream. As with the conventional starter illustrated by FIG. 3, the load reaction force on the yoke 42 is in a direction to move the wheel 40 into the motive fluid stream.

The extent of movement of the yoke 42 and, consequently, the turbine wheel 40 is limited by means of a tang 50 and a stop member 52. The position of the stop member 52, adjustable in accordance with this invention, limits the maximum degree of immersion of the buckets 41 in the fluid stream. A compression spring 53 applies a relatively light reference force on the yoke 42 in a direction to move the turbine buckets 41 into the fluid stream and the tang 50 into engagement with the stop member 52.

The operation of the Dantowitz type starter will now be described briefly. Upon initiation of the start cycle, the motive fluid and the load exert a net torque on the turbine wheel, which is defined as the difference between the torque generated on the wheel by the high pressure motive fluid and the load reaction torque, or output torque. The forces exerted on the turbine wheel by the motive fluid stream and the load are also transmitted to the yoke 42, the net effect of the forces on the yoke being proportional to the actual net torque on the wheel and in a direction to move the wheel out of the fluid stream. The compression spring 53 exerts a reference force on the yoke 42 in a direction to move the wheel 10 into the fluid stream, the reference force being proportional to a desired net torque. The wheel 10 thus moves to an equilibrium position in which the net torque is equal to the desired net torque. When the spring 53 exerts a substantially constant force on the yoke 42, constant acceleration results. It will be at this point obvious that the Dantowitz type of starter is a true movable wheel starter in that the wheel is moved through a range of positions during the start cycle.

Figure 2:
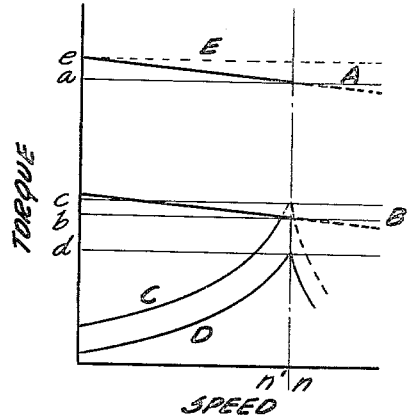
FIG. 2 is a graphical illustration similar to FIG. 1 for a fixed wheel starter installation in which the allowable engine gearbox torque is severely limited.
Figure 5:
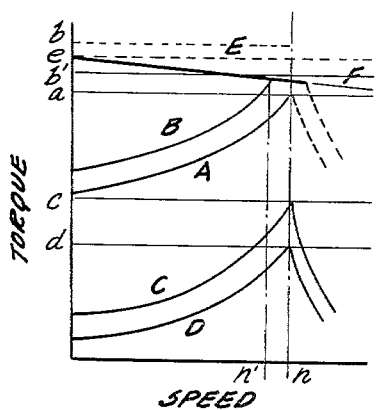
FIG. 5 is a graphical illustration similar to FIGS. 1 and 2 showing variations of starter output torque and engine drag torque with ambient temperature for the starter arrangement shown by FIG. 4.

FIG. 5 graphically illustrates the variations of starter output torque and engine drag torque for such a starter arrangement, the lines having significance similar to those of FIGS. 1 and 2. Taking first the case of starting at the maximum ambient temperature, line D represents the drag torque and line A represents the output torque. It will be noted that the vertical distance between lines A and D is substantially identical at all speeds, thus representing constant accelerating torque for accelerating the driven engine. It will also be noted that the output torque at no time exceeds the maximum allowable gearbox torque represented by line E. When, however, the engine is started at the minimum ambient temperature, the engine drag torque represented by line C is substantially higher. Therefore, in order to maintain constant acceleration at the desired level, the output torque shown by line B must also be higher than that at the higher ambient temperature. Consequently, in the example chosen, the maximum output torque, having a magnitude represented by $b$, will exceed the maximum allowable gearbox torque. The control system described by Dantowitz has no provision for preventing such excessive output torque levels.

This invention provides the means for preventing excessive output torque in the Dantowitz type of starter, the means being identical to that described above in connection with the conventional form of movable wheel starter. Briefly, the stop member 52 is connected to a piston 54 in a cylinder 55. A biasing spring 56 urges the piston 54 and the stop member 52 to the positions illustrated in FIG. 4, the other side of the piston being exposed to the pressure in the breech 46 through conduit 59. The spring force of the spring 56 is such that it maintains the piston 54 in the illustrated position until the pressure within the breech 46 exceeds the pressure created at the minimum ambient temperature. At higher temperatures, and pressures, the piston 54 and the stop member 52 are moved to new equilibrium positions. It will be appreciated that it is possible to select the spring 58 and the piston 54 such that the maximum output torque produced at all ambient temperatures is specified by line F of FIG. 5.

Returning to the example illustrated in FIG. 5, the output torque produced at the minimum ambient temperature will follow line B until point $b'$ is reached at a speed $n'$. At that point, the tang 50 will be in contact with the stop means 52 and the wheel 40 cannot be moved any further into the fluid stream. From the speed $n'$ on up to the self-sustaining speed $n$, the output torque will follow line F instead of line B. The acceleration level drops slightly, but the maximum allowable gearbox torque is not exceeded.

In both types of starters described above, it has been found that violent movement of the starter turbine wheel and its supporting yoke can result from accelerations experienced when the starter is inoperative, particularly when the starter is used in an aircraft installation. Substantial damage to the starter caused by vibration and impact forces can result from such unrestrained movements. Means for locking the turbine wheel when the starter is inoperative in order to prevent such undesired movement is described and claimed in a co-pending application entitled, Control System for Fluid Turbines, Serial No. 289,511, filed on June 21, 1963, now Patent No. 3,180,614, in the names of F. R. Ellenberger and R. A. Carter, and assigned to the assignee of this invention. FIG. 6 illustrates how the Dantowitz type of starter, for example, can be modified to include the locking means. As shown, a fixed stop member 51 is provided, and the stop member 52 is attached to a second piston 65 in the cylinder 55'. A spring 66 urges the piston 65 in a direction to move the tang 50 into contact with the stop member 51, the force of the spring 66 being sufficient to overcome completely the force of spring 53. The other face of the second piston 65 is exposed to the pressure of the motive fluid within the breech 46 through a conduit 67, the force exerted on the piston 65 by the fluid pressure being sufficient to overcome the force of the spring 66 and move the piston 65 into contact with the first piston 54 whenever motive fluid is being supplied.

In operation, the spring 66 locks the turbine wheel 40 in the position shown by FIG. 6 whenever the starter is inoperative, thus preventing undesired movement. When the propellant is ignited, the force exerted by its pressure overcomes completely the force of the spring 66 and forces the piston 65 into engagement with the piston 54, thereby withdrawing stop member 52 from contact with the tang 50. The pistons 65 and 54 thus form a composite piston having fluid pressure acting on both sides through conduits 59 and 67. Since the piston 54 has substantially larger area than the piston 65, the net pressure force on the composite piston urges the stop member 52 to the right as viewed in FIG. 6. The force of spring 56 opposes the net pressure force. As a result, the stop member 52 moves to an equilibrium position as described previously. Upon termination of the start cycle, the spring 66 again moves the wheel to the position illustrated by FIG. 6.

The conventional movable wheel starter illustrated by FIG. 3 can be similarly modified. There, the force of the locking spring would be added to the force of the tension spring 23 to lock the tang 20 against stop member 21 when the starter is inoperative.

From the foregoing, it will be seen that this invention provides novel means for limiting the starter output torque to a level below the maximum allowable gearbox torque of the engine being started. In addition, the starter control of this invention provides that the maximum allowable torque is approached when the starter is operating at its minimum ambient temperature.

While preferred embodiments of this invention have been described, it will be obvious to those skilled in the art that various changes and modifications may be made without departing from the invention, and it is therefore intended to cover in the appended claims all such changes and modifications as fall within the true spirit and scope of the invention.

What is claimed as new and desired to secure by Letters Patent of the United States is:

1. Means for controlling the maximum torque imposed on a turbine wheel by a stream of motive fluid comprising:
    (a) a turbine wheel,
    (b) movable mounting means rotatably supporting said turbine wheel and adapted to move said wheel to vary the degree of immersion of the wheel in the motive fluid stream and thereby vary the magnitude of the torque exerted on the wheel by the fluid stream,
    (c) stop means limiting the maximum degree of immersion of the wheel in the motive fluid stream,
    (d) and adjusting means responsive to the pressure of said motive fluid stream for varying the position of said stop means such that a substantially constant maximum torque is scheduled at all pressures.

2. Means for controlling the maximum torque imposed on a turbine wheel by a stream of motive fluid comprising:
    (a) a turbine wheel,
    (b) movable mounting means rotatably supporting said turbine wheel and adapted to move said wheel to vary the degree of immersion of the wheel in the motive fluid stream and thereby vary the magnitude of the torque exerted on the wheel by the fluid stream,
    (c) stop means positioned to engage said movable mounting means to limit the maximum degree of immersion of the wheel in the motive fluid stream,
    (d) and adjusting means for varying the position of said stop means,
    (e) said adjusting means comprising biasing means urging said stop means in a direction to increase the maximum degree of immersion and means responsive to the pressure of said motive fluid stream opposing said biasing means to move said stop means to an equilibrium position,
    (f) the equilibrium position of said stop means being such that a substantially constant maximum torque is scheduled at all pressures.

3. Means for controlling the maximum torque imposed on a turbine wheel comprising:
    (a) supply means adapted to supply a high pressure stream of motive fluid,
    (b) a turbine wheel,
    (c) movable mounting means rotatably supporting said turbine wheel and adapted to move said wheel through a range of positions to vary the degree of immersion of the wheel in the motive fluid stream and thereby vary the magnitude of the torque exerted on the wheel by the fluid stream,
    (d) said range of positions bounded by a first end position of maximum immersion and a second end position of minimum immersion,
    (e) stop means engaging said movable mounting means to hold said turbine wheel in said second end position when said supply means is inoperative,
    (f) and adjusting means shifting said stop means to an equilibrium position when a high pressure stream of motive fluid is being supplied so as to permit movement of said turbine wheel through said range of positions,
    (g) said stop means in said equilibrium position being located to engage said movable mounting means to define said first end position,
    (h) said adjusting means being responsive to the pressure of said motive fluid stream for varying the equilibrium position of said stop means such that a substantially constant maximum torque is scheduled at all pressures.

4. Means for controlling the maximum torque imposed on a turbine wheel comprising:
    (a) supply means adapted to supply a high pressure stream of motive fluid,
    (b) a turbine wheel,
    (c) movable mounting means rotatably supporting said turbine wheel and adapted to move said wheel through a range of positions to vary the degree of immersion of the wheel in the motive fluid stream and thereby vary the magnitude of the torque exerted on the wheel by the fluid stream,
    (d) said range of positions bounded by a first end position of maximum immersion and a second end position of minimum immersion, (e) stop means engaging said movable mounting means to hold said turbine wheel in said second end position when said supply means is inoperative, (f) and adjusting means shifting said stop means to an equilibrium position when a high pressure stream of motive fluid is being supplied so as to permit movement of said turbine wheel through said range of positions, (g) said stop means in said equilibrium position being located to engage said movable mounting means to define said first end position, (h) said adjusting means comprising biasing means urging said stop means in a direction to increase the maximum degree of immersion and means responsive to the pressure of said motive fluid stream opposing said biasing means to move said stop means to said equilibrium position, (i) said equilibrium position of said stop means being such that a substantially constant maximum torque is scheduled at all pressures.

5. Means for controlling the torque imposed on a turbine wheel comprising:

(a) an axial flow turbine wheel having a row of turbine buckets peripherally mounted thereon, (b) supply means adapted to supply a high pressure stream of motive fluid, (c) movable mounting means rotatably supporting said turbine wheel and adapted to move said wheel through a range of positions to vary the degree of immersion of the turbine buckets in the motive fluid stream and thereby vary the magnitude of the torque exerted on the wheel by the fluid stream, (d) said range of positions bounded by a first end position of maximum immersion and a second end position of minimum immersion, (e) stop means engaging said movable mounting means to hold said turbine wheel in said second end position when said supply means is inoperative, (f) adjusting means for shifting said stop means to an equilibrium position when a high pressure stream of motive fluid is being supplied so as to permit movement of said turbine wheel through said range of positions, (g) said stop means in said equilibrium position being located to engage said movable mounting means to define said first end position, (h) said adjusting means being responsive to the pressure of said motive fluid stream for varying the equilibrium position of said stop means such that a substantially constant maximum torque is scheduled at all pressures, (i) and control means effective when a high pressure stream of motive fluid is being supplied for locating said turbine wheel within said range of positions such that the actual net torque on the wheel is equal to a desired net torque.

6. Means for controlling the maximum torque imposed on a turbine wheel comprising:

(a) supply means to supply a high pressure stream of motive fluid, (b) a turbine wheel, (c) movable mounting means rotatably supporting said turbine wheel and adapted to move said wheel through a range of positions to vary the degree of immersion of the wheel in the motive fluid stream and thereby vary the magnitude of the torque exerted on the wheel by the fluid stream, (d) said range of positions bounded by a first end position of maximum immersion and a second end position of minimum immersion, (e) movable stop means being located to engage said movable mounting means to define said first end position when a high pressure stream of motive fluid is being supplied, (f) a cylinder, (g) a piston reciprocally mounted in said cylinder, (h) means connecting said stop means to said piston for movement therewith so as to thereby vary said first end position, (i) means imposing a biasing force on said piston in a direction to increase the maximum degree of immersion, (j) and fluid communication means between said supply means and said cylinder, (k) the net force exerted on said piston by the pressure of the motive fluid being oppositely directed to the biasing force so as to move said stop means to an equilibrium position, (l) the equilibrium position of said stop means being such that a substantially constant maximum torque is scheduled at all pressures.

7. Means for controlling the maximum torque imposed on a turbine wheel comprising:

(a) supply means to supply a high pressure stream of motive fluid, (b) a turbine wheel, (c) movable mounting means rotatably supporting said turbine wheel and adapted to move said wheel through a range of positions to vary the degree of immersion of the wheel in the motive fluid stream and thereby vary the magnitude of the torque exerted on the wheel by the fluid stream, (d) said range of positions bounded by a first end position of maximum immersion and a second end position of minimum immersion, (e) movable stop means, (f) a cylinder, (g) a composite piston comprising first and second pistons reciprocally mounted in said cylinder, (h) means connecting said stop means to said second piston for movement therewith, (i) first means imposing a biasing force on said second piston to move said stop means into engagement with said movable mounting means to hold said turbine wheel in said second end position when said supply means is inoperative, (j) first fluid communication means between said supply means and said cylinder to subject said second piston to the pressure of the motive fluid, (k) the force exerted on said second piston by the pressure of the motive fluid being oppositely directed to said first biasing force and being sufficient to overcome completely said first biasing force to move said second piston into contact with said first piston and thereby move said stop means from engagement with said movable mounting means to an equilibrium position in which said stop means is located to engage said movable mounting means to define said first end position, (l) second means imposing a biasing force on said first piston in a direction to increase the maximum degree of immersion, (m) and second fluid communication means between said supply means and said cylinder to subject said first piston to the pressure of the motive fluid, the force exerted on said first piston by the pressure of the motive fluid being oppositely directed to said second biasing force and to the force exerted on said second piston by the pressure of the motive fluid, (n) the net force exerted on said composite piston by the pressure of the motive fluid being oppositely directed to said second biasing force so as to move said stop means to the equilibrium position, (o) the equilibrium position being such that a substantially constant maximum torque is scheduled at all pressures, (p) and control means effective when said stop means is removed from engagement with said mounting means locating said turbine wheel with said range of positions such that the actual net torque on the wheel is equal to a desired net torque.

References Cited by the Examiner

UNITED STATES PATENTS

| | | | |
|---|---|---|---|
| 2,609,661 | 9/52 | Nardone | 253—59 X |
| 2,614,798 | 10/52 | Rubbra | 253—59 |
| 2,685,428 | 8/54 | Tressl | 253—59 X |
| 2,689,707 | 9/54 | Graham | 253—59 |
| 3,094,311 | 6/63 | Goldstein | 253—59 |
| 3,107,896 | 10/63 | Dantowitz | 253—59 |

FOREIGN PATENTS 1,074,095  3/54  France.

SAMUEL LEVINE, *Primary Examiner.*

JULIUS E. WEST, *Examiner.*